United States Patent Office 2,958,235
Patented Nov. 1, 1960

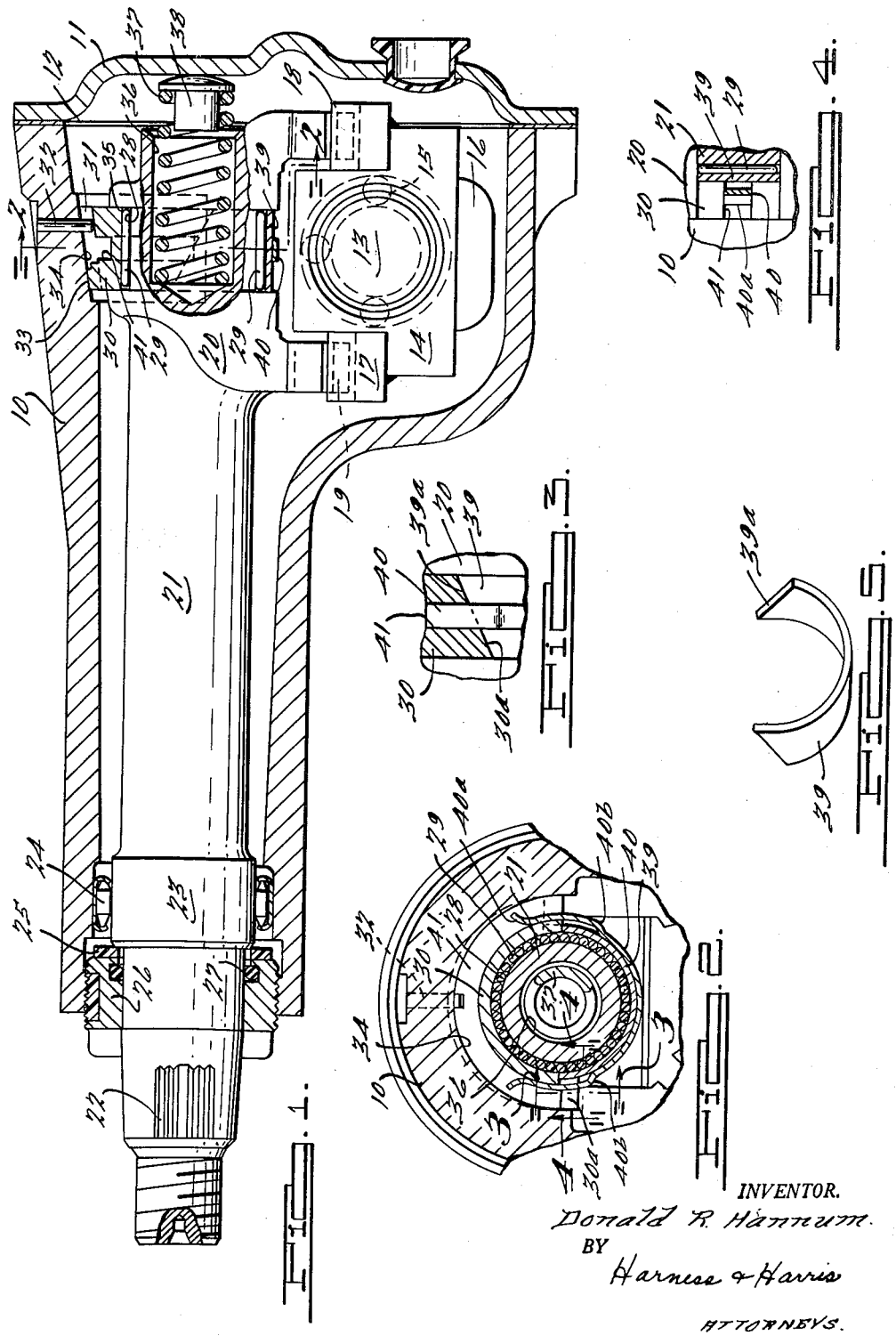

2,958,235

VEHICLE STEERING MECHANISM

Donald R. Hannum, Warren, Mich., assignor to Chrysler Corporation, Highland Park, Mich., a corporation of Delaware Filed Nov. 23, 1959, Ser. No. 854,708

12 Claims. (Cl. 74—499)

This invention relates to vehicle steering mechanisms particularly of the ball-nut and lever type wherein the ball-nut is engaged with a worm shaft to ride axially along the latter upon rotation of the worm shaft under the manual control of the vehicle operator.

In one type of such a construction, two gear racks extending axially of the worm at opposite sides of the nut are carried by the latter and engage a pair of spaced sector gears which extend radially from a rockshaft. The latter extends transversely of the worm and is operatively connected with a steering gear for turning the vehicle's dirigible wheels when axial movement of the ball-nut along the worm causes pivoting of the rockshaft in one direction or the opposite in consequence of the connection between the ball-nut and rockshaft.

In such a construction the reaction of the steering force between the teeth of the gear racks and sector gears imparts a thrust radially against one side of the rockshaft. This thrust in turn is carried by suitable bearings which journal the rockshaft. It has been customary heretofore to provide a cantilever bearing support for the sector gear portion of the rockshaft by means of a set of needle bearings at one side of the sector gears, or to provide a pair of needle bearing sets for the rockshaft at opposite sides of the sector gears. The latter situation necessitates axial extensions of the rockshaft in opposite directions from the sector gears and thus increases the cost and bulkiness of the steering unit and renders the same unsuitable where compactness is critical. In either situation, the bearing support for the rockshaft is not at the location of maximum load, so that the increased leverage acting against the bearing support and the tendency for uneven wear must be compensated for by a stronger and more costly structure.

An object of the present invention is to provide an improved simplified and economically manufactured segmental bearing structure for a rockshaft comprising an annular recirculating set of needle bearings arranged to support the rockshaft at the region of optimum steering load and to avoid the necessity of a cantilever structure at the region of the rockshaft subject to maximum load, or of bridging this region between two bearing sets.

A more specific object is to provide such a structure wherein a set of needle bearings extending axially of the rockshaft are arranged around the region of the latter that most closely crosses the worm shaft. The needle bearings in a portion of the bearing set at the side of the rockshaft which receives the thrust of the steering load are confined between segmental bearing surfaces of the rockshaft and a bearing collar in bearing engagement with these surfaces. A segmental guide loosely confines the remaining needle bearings and serves to guide recirculation thereof around the rockshaft when the latter is pivoted in a steering operation.

In such a structure, suitable means must be employed for securing the segmental guides in position, as for example by securing the ends of the latter to the juxtaposed ends of the bearing collar. In order to accomplish a connection between the juxtaposed ends of the segmental bearing collar and guide economically, these members will preferably have the same radial thickness. Inasmuch as the guide is not subject to the bearing load and may be comparatively thin in its radial dimension for optimum economy, the bearing collar which receives the load will also be comparatively thin and must be reinforced by an outer segmental collar portion.

It is accordingly another object to provide an improved structure of the type described above which feasibly avoids the necessity of positively connecting the bearing collar and guide and thereby enables the utilization of a unitary bearing collar having a comparatively large radial dimension with respect to the corresponding dimension of the guide.

Another object is to provide such a structure wherein the juxtaposed ends of the guide and bearing collar abut along lines oblique to the circumference of the rockshaft, whereby uninterrupted recirculation of the needle bearings past the juncture between the abutting ends of the guide and bearing collar is smoothly accomplished without tendency for momentary jamming of the needle bearings.

Another object is to provide such a structure wherein the segmental bearing surface of the rockshaft is formed on an axial portion thereof spacing a pair of radially extending sector gears carried by the rockshaft. The sector gears mesh with gear racks carried by the worm driven nut, the gear racks extending at opposite sides of the worm and parallel to the axis thereof and transversely to the axis of the rockshaft. Thus the steering load is feasibly distributed uniformly between a pair of sector gears spaced by the worm driven nut, whereby the spacing between the axis of the rockshaft and nut is minimized and a compact unit is enabled.

Still another object is to provide an improved structure of the above character wherein the outer periphery of the bearing collar and the housing for the worm and rockshaft have mating surfaces inclined with respect to the axis of the rockshaft to cam the sector gears of the rockshaft snugly into mesh with the gear racks upon axial adjustment of the rockshaft, thereby to provide simple effective means for minimizing play between the meshed gear teeth and at the same time to employ the housing most effectively as a backing or reinforcement for the segmental bearing collar so as to enable the latter to resist the thrust against the rockshaft during steering operations.

Other objects of this invention will appear in the following description and appended claims, reference being had to the accompanying drawings forming a part of this specification wherein like reference characters designate corresponding parts in the several views.

Figure 1 is a sectional view taken longitudinally of the rockshaft and transversely of the manually controlled worm shaft of a vehicle steering gear.

Figure 2 is a fragmentary sectional view taken in the direction of the arrows substantially along the line 2—2 of Figure 1.

Figure 3 is a fragmentary elevational view of the juncture between the bearing collar and needle bearing guide associated with the rockshaft, taken in the direction of the arrows 3—3 of Figure 2.

Figure 4 is a fragmentary sectional view taken in the direction of the arrows substantially along the line 4—4 of Figure 2.

Figure 5 is an isometric view of the needle bearing guide removed from the rockshaft.

It is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

Referring in more particularity to the drawings, an embodiment of the present invention is illustrated by way of example comprising an outer housing 10 which is suitably secured to the vehicle chassis. A tubular portion of the housing 10 is illustrated which is closed at one end by a plate 11 spaced from the housing 10 by a gasket 12 and secured to the housing 10, as for example by suitable bolts not shown. Journalled within the housing 10 is a helically grooved worm shaft 13 operably connected with the vehicle steering wheel for manual control by the operator.

A nut 14 having a helically grooved interior mating with the helical grooves of the worm shaft rides axially along and is connected with the latter by a plurality of recirculating balls 15 in the mating grooves of the worm 13 and nut 14. Recirculation of the balls 15 to confine the latter within the limits of the nut 14 may be accomplished by means of a typical ball crossover tunnel 16 which communicates with the mating helical grooves adjacent opposite ends of the nut 14 to receive and discharge the balls 15 in accordance with relative rotation between the worm 13 and nut 14. If desired, a conventional power actuated follow-up type servo mechanism may be employed to assist manual control of the worm shaft during steering. The structure thus far may be conventional and is accordingly not described in further detail.

Secured to opposite sides of the nut 14 and extending axially of the worm 13 are two gear racks 17, each having upwardly directed gear teeth 18 which mate with teeth 19 at the lower ends of a pair of swinging arms or sector gears 20. The latter are integral with a rockshaft 21 having its axis perpendicular to the axis of the worm 13 and extending leftward from the arms 20 through the housing 10 for attachment at 22 with the vehicle steering linkage. The left end of rockshaft 21 is provided with an enlarged annular bearing surface 23 journalled within the housing 10 by means of an annular set of needle bearings 24. A wear washer 25 abuts the outer shoulder of the annular enlargement 23 and is secured in position by a nut 26 screwed into the left end of housing 10. A conventional annular seal 27 is carried by the nut 26 leftward of the washer 25.

At the region of the rockshaft 21 where the latter's axis passes in closest proximity to the axis of the worm 13, a circular cylindrical bearing surface 28 of the rockshaft 21 is located centrally between the arms 20. The bearing surface 28 need extend below the lower half of the rockshaft 21 only to the extent required by the latter's pivotal motion as explained below. The portion of the rockshaft 21 immediately below the bearing surface 28 need not be provided with a bearing finish but is reasonably smooth. In the present instance, this portion of the rockshaft 21 below the bearing surface 28 is a circular cylindrical continuation of the surface 28, Figure 2, although this lower surface portion may have an elliptical or other cylindrical shape in accordance with production or spatial requirements, as will be apparent from the following.

Extending axially of the shaft 21 and arranged around the latter at the region of the bearing surface 28 is an annular set of needle bearings 29. A comparatively rigid segmental bearing collar 30 having an inner cylindrical bearing surface confines the needle bearings 29 around the upper half of shaft 21, with the inner bearing surface of collar 30 in bearing contact with the bearings 29. The collar 30 is provided with an axial slot 31 into which the lower end of a key 32 closely fits, Figure 1. The upper end of key 32 is secured within the housing 10 to prevent rotational movement of collar 30.

As illustrated in Figure 2, the collar 30 extends in opposite directions from the crest of bearing surface 28 so as to enclose slightly more than the upper half of the circumference of the annular set of needle bearings 29 and to hold the latter in bearing contact with surface 28. The lower ends of collar 30 are formed on a bias as described below and the inner bearing surfaces of said ends extend slightly beyond the horizontal axial plane of rockshaft 21 in planes perpendicular to said axial plane, Figure 2.

The outer cylindrical surface 33 of the collar 30 is formed on a bias with respect to the axis of rockshaft 21, as illustrated in Figures 1 and 2, and mates with a correspondingly biased cylindrical surface 34 on the interior of housing 10 to cam collar 30 downwardly toward the upper bearing surface 28 and thereby to urge the sector teeth 19 snugly into mesh with the teeth 18 of the gear racks 17 upon leftward movement of shaft 21 in Figure 1. Specifically, the mating cylindrical surfaces 33 and 34 are formed about an axis which intersects the axis of shaft 21 at a small angle of preferably less than 10° and which lies in the axial plane of symmetry of sector gear 20 when the latter is in the straight-ahead steering position illustrated. Radial enlargements 35 of the arms 20 at opposite ends of the collar 30 retain the latter and needle bearings 29 in position.

In order to urge the rockshaft 21 yieldingly leftward, a coaxial bore 36 provided in its right end contains a coil spring 37 seated under compression between the base of the bore 36 and an outer spring retainer 38 which in turn is seated against the end closure plate 11. Adjustment of the axial position of rockshaft 21 is accomplished by adjusting nut 26 until the desired pressure between the gear teeth 18 and 19 is obtained. The material of wear washer 25 is determined so that the latter, subject to the force of spring 37, will wear at a rate corresponding to the wear of the aforesaid gear teeth. In consequence, as these elements wear, spring 37 will shift rockshaft 21 leftward, thereby to cam the latter downwardly toward the gear racks 17 and minimize play or backlash in the mechanism substantially throughout its operating life.

In order to enable pivotal steering motion of the rockshaft 21 and to obtain circulation of the needle bearings 29 around the bearing surface 28 during such pivotal motion, a segmental bearing guide 39 is provided around the under side of the bearings 29 in Figures 1 and 2. In the present instance the guide 39 is circularly cylindrical in order to conform to the circular sectional shape of the under side of rockshaft 21. However if the under side of the rockshaft 21 at the region of the needle bearings 29 is formed with any other cylindrical shape, guide 39 will be correspondingly shaped so as to loosely confine the bearings 29 against the under side of the rockshaft 21. In this connection, inasmuch as the thrust of the steering movement directed against the sector gear teeth 19 is upward in Figures 1 and 2, this thrust is received by the collar 30 above the rockshaft. The bearings 29 at the under side of the rockshaft 21 need not be maintained in bearing contact therewith by the loosely fitting guide 39, so that appreciable economies in structure are obtained. The upper ends 39a of the guide 39 are formed on a bias or obliquely to the circumference of the annular bearing set 29, Figure 3, and in parallelism with the lower bias formed ends 30a of the collar 30 so as to abut the same along the oblique line of juncture 30a, 39a centered approximately on the horizontal axial plane of shaft 21, Figure 2. Below the latter axial plane, the cylindrical guide 39 is approximately coaxial with shaft 20. The end portions of the guide 39 above the latter axial plane are perpendicular thereto and parallel to the lower inner surfaces of collar 30.

As illustrated in Figures 2–4, the loosely fitting guide 39 is retained in position by a C-shaped spring clip 40 having outwardly turned ends 40a confined within a circumferentially extending groove 41 in the outer surface of collar 30. The upper portions of spring clip 40 are offset slightly at 40b in order to accommodate the thickness of collar 30 at the base of groove 41. It is to be noted that key 32 is offset from the vertical mid-plane of collar 30 as indicated in Figure 1 so as not to enter groove 41.

As is apparent from the structure described, the reaction thrust of the steering movement between worm 13 and rockshaft 21 will be directed upwardly through the gear racks 17 to the sector gears 20 and thence through the needle bearings 29 at the upper portion of the rockshaft 21 containing the bearing surface 28. This thrust is taken by the inner bearing surface of collar 30, which latter seats against the cylindrical surface 34 of housing 10. The structure disclosed comprising the paired swinging arms 20 at the opposite sides of the worm 13 not only balances the steering load at opposite sides of the nut 14 and prevents the latter from rotating around the axis of worm shaft 13, but enables the latter to pass comparatively closely to the axis of shaft 21, thereby achieving optimum compactness of structure.

By virtue of the separable guide 39 loosely confining the needle bearings 29 at the lower portion of the rockshaft 21, the bearings 29 are enabled to recirculate around the upper load bearing portion of the rockshaft 21 during steering movement. This recirculation of the needle bearings 29 is facilitated by the oblique juncture between the abutting ends 30a and 39a. Thus if one surface or the other of the collar 30 or guide 39 should accidentally become offset slightly into the path of the circulating bearings 29, the latter will not meet the entire line of abutment 30a, 39a simultaneously and comparatively smooth recirculation of the bearings 29 is assured. Furthermore, by virtue of the end portions of collar 30 below the horizontal axial plane of shaft 21 in Figure 2, as well as the end portions of guide 39 above the latter plane, being tangential to the outer circumference of the annular bearing set 29 at this plane, these end portions will ordinarily lie radially outwardly of the path of the circulating bearings 29 and will not interfere with circulation of the latter into and out of the region enclosed by guide 39.

In addition, not only is economy in the manufacture of the bearing surface 28 and guide 39 obtained by eliminating the necessity of close tolerances therebetween, but the structure shown provides bearing support for the shaft 21 directly in opposition to the thrust of worm shaft 13 without the necessity of a cantilevered bearing support for shaft 21 or the provision of a bearing support for the latter rightward of the swinging arms 20.

I claim:

1. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, said rockshaft having a bearing surface between said arms, a set of needle bearings disposed around said rockshaft between said arms and engaging said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, and means for holding said guide in position with its ends snugly abutting said bearing collar means.

2. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a coaxial cylindrical bearing surface thereon at the region of minimum distance between the axes of said rockshaft and worm, a set of needle bearings disposed around said rockshaft, the needle bearings of said set extending axially of said rockshaft in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, and means for holding said guide in position with its ends snugly abutting said bearing collar means.

3. In a steering gear, a worm, a nut operably connected with said worm for movement axially therealong upon rotation of said worm, a rockshaft extending transversely of said worm at one side thereof and having a swinging arm operably connected with said nut for swinging said rockshaft in a steering operation upon said movement of said nut, said rockshaft having a coaxial cylindrical bearing surface thereon at the region of minimum distance between the axes of said rockshaft and worm, a set of needle bearings disposed around said rockshaft, the needle bearings of said set extending axially of said rockshaft in bearing engagement with said bearing surface, a supporting structure including load-sustaining bearing collar means enclosing in bearing engagement therewith the portion of said set of bearings at the side of said rockshaft remote from said worm, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, and means for holding said guide in position with its ends snugly abutting said bearing collar means.

4. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a bearing surface thereon at the region of minimum distance between said rockshaft and worm, a set of needle bearings disposed around said rockshaft in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, and a C-shaped spring clip extending around said guide and juxtaposed portions of said collar means to hold said guide in position with its ends snugly abutting the ends of said bearing collar means.

5. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a bearing surface thereon at the region of minimum distance between said rockshaft and worm, a set of needle bearings disposed around said rockshaft in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, said guide having recessed portions extending circumferentially of said rockshaft adjacent opposite sides thereof, and a spring clip extending around said guide to hold the same in position, the opposite ends of said clip extending into said recessed portions and clamping said collar means therebetween.

6. In a steering gear, a worm, a nut operably connected with said worm for movement axially therealong upon rotation of said worm, a rockshaft extending transversely of said worm at one side thereof and having a swinging arm operably connected with said nut for swinging said rockshaft in a steering operation upon said movement of said nut, said rockshaft having a coaxial cylindrical bearing surface thereon at the region of minimum distance between the axes of said rockshaft and worm, a set of needle bearings disposed around said rockshaft, the needle bearings of said set extending axially of said rockshaft in bearing engagement with said bearing surface, a supporting structure including a segmental cylindrical bushing enclosing in bearing engagement therewith the portion of said set of bearings at the side of said rockshaft remote from said worm, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, said collar means having recessed portions extending circumferentially of said rockshaft adjacent opposite sides thereof, and a spring clip extending around said guide to hold the same in position, the opposite ends of said clip extending into said recessed portions and clamping said collar means therebetween.

7. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, said rockshaft having a bearing surface between said arms, a set of needle bearings disposed around said rockshaft and extending axially thereof between said arms in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, and means for holding said guide in position with its ends snugly abutting said bearing collar means.

8. In a steering gear, a worm, a nut operably connected with said worm for movement axially therealong upon rotation of said worm, a rockshaft extending transversely of said worm at one side thereof and having a pair of swinging arms extending radially from said rockshaft at opposite sides of said worm, said arms being operatively connected with said nut at said opposite sides for swinging said rockshaft in a steering operation upon said movement of said nut, said rockshaft having a coaxial cylindrical bearing surface between said arms, a set of needle bearings disposed around said rockshaft and extending axially thereof between said arms in bearing engagement with said bearing surface, a supporting structure including segmental cylindrical load-sustaining bearing collar means enclosing in bearing engagement therewith the portion of said set of bearings at the side of said rockshaft remote from said worm, a segmental cylindrical guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, and means for holding said guide in position with its ends snugly abutting said bearing collar means.

9. In a steering gear, a worm, a nut operably connected with said worm for movement axially therealong upon rotation of said worm, a rockshaft extending transversely of said worm at one side thereof and having a pair of swinging arms extending radially from said rockshaft at opposite sides of said worm, said arms being operatively connected with said nut at said opposite sides for swinging said rockshaft in a steering operation upon said movement of said nut, the operative connection between said arms and nut comprising a pair of gear racks carried by said nut at said opposite sides and having gear teeth facing in the direction of said one side, and also comprising a pair of sector gears carried by said arms and meshed with said gear racks respectively, said rockshaft having a coaxial cylindrical bearing surface between said arms, a set of needle bearings disposed around said rockshaft and extending axially thereof between said arms in bearing engagement with said bearing surface, a supporting structure including segmental cylindrical load-sustaining bearing collar means enclosing in bearing engagement therewith the portion of said set of bearings at the side of said rockshaft remote from said worm, a segmental cylindrical guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, and means for holding said guide in position with its ends snugly abutting said bearing collar means.

10. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, the operative connection between said arms and nut comprising a pair of gear racks carried by said nut at said opposite sides and having gear teeth facing in the direction of said one side, and also comprising a pair of sector gears carried by said arms and meshed with said gear racks respectively, said rockshaft having a bearing surface between said arms, a set of needle bearings disposed around said rockshaft and extending axially thereof between said arms in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, and means for holding said guide in position with its ends snugly abutting said bearing collar means.

11. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, the operative connection between said arms and nut comprising a pair of gear racks carried by said nut at said opposite sides and having gear teeth facing in the direction of said one side, and also comprising a pair of sector gears carried by said arms and meshed with said gear racks respectively, said rockshaft having a bearing surface between said arms, a set of needle bearings dsiposed around said rockshaft and extending axially thereof between said arms in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, and a C-shaped spring clip extending around said guide and juxtaposed portions of said collar means to hold said guide in position with its ends snugly abutting the ends of said collar means.

12. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, the operative connection between said arms and nut comprising a pair of gear racks carried by said nut at said opposite sides and having gear teeth facing in the direction of said one side, and also comprising a pair of sector gears carried by said arms and meshed with said gear racks respectively, said rockshaft having a bearing surface between said arms, a set of needle bearings disposed around said rockshaft and extending axially thereof between said arms in bearing engagment with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, said guide and bearing collar means cooperating to extend around said set of needle bearings and having abutting ends meeting along lines oblique to said needle bearings to facilitate recirculation of the latter past said abutting ends, said collar means having recessed portions extending circumferentially of said rockshaft adjacent opposite sides thereof, and a spring clip extending around said guide to hold the same in position with its ends snugly abutting the ends of said collar means, the opposite ends of said clip extending into said recessed portions and clamping said collar means therebetween.

References Cited in the file of this patent

FOREIGN PATENTS 765,014   France _____ June 1, 1934